United States Patent [19]

Sirianni

[11] Patent Number: 5,413,220
[45] Date of Patent: May 9, 1995

[54] ENERGY ATTENUATING SUPPORT PLATES FOR PROTECTING OBJECTS THEREON

[75] Inventor: John F. Sirianni, Webster, N.Y.

[73] Assignee: Eastman Kodak Company, Rochester, N.Y.

[21] Appl. No.: 251,454

[22] Filed: May 31, 1994

[51] Int. Cl.⁶ .......................................... B65D 85/671
[52] U.S. Cl. .................................. 206/395; 206/397; 206/416
[58] Field of Search ............. 206/316.1, 389, 395–397, 206/408, 409, 413–416; 242/159, 160.1–160.4, 384, 384.4

[56] References Cited

U.S. PATENT DOCUMENTS

| | | | |
|---|---|---|---|
| 3,260,362 | 7/1966 | Schwinne | 206/59 |
| 3,339,718 | 9/1967 | Geier | 206/52 |
| 4,122,949 | 10/1978 | Blatt | 206/303 |
| 4,570,794 | 2/1986 | Capitao, Jr. | 206/394 |
| 4,732,271 | 3/1988 | Solyntjes | 206/416 |
| 4,826,008 | 5/1989 | Cloosterman | 206/413 |
| 4,858,762 | 8/1989 | Kewin | 206/414 |
| 4,877,133 | 10/1989 | Klenter | 206/416 |
| 4,878,581 | 11/1989 | Beery | 206/416 |
| 5,167,322 | 12/1992 | Lemaire | 206/410 |
| 5,232,092 | 8/1993 | Chamberlin et al. | 206/387 |

*Primary Examiner*—Jimmy G. Foster
*Attorney, Agent, or Firm*—Charles E. Snee, III

[57] ABSTRACT

An energy attenuating support plate (10) for protecting an object thereon, such as a roll (R) of photographic web, from damage due to shock during handling and transportation. The support plate (10) is engageably attached to either end of the core (C) of the roll (R) and provides a means of absorbing impact energy incurred by the support plate (10). The molded plastic plate (10) comprises first, second and third energy attenuation regions (24,30,40) that successively absorb as-received energy before such energy encounters the roll (R) supported thereon.

14 Claims, 6 Drawing Sheets

ENERGY ATTENUATING SUPPORT PLATES FOR PROTECTING OBJECTS THEREON

FIELD OF THE INVENTION

The invention relates generally to support plates. More particularly, the invention concerns energy attenuating support plates for protecting objects, such as a roll of photosensitive web, from transportation and handling damage by absorbing energy associated with shock before the object supported thereon is exposed to such shock.

BACKGROUND OF THE INVENTION

Currently, rolls of photosensitive web are generally shipped from the manufacturer to the customer in containers, such as corrugated boxes. The rolls are first wrapped in a light tight bag prior to being placed in the shipping box. Experience has indicated that a significant percentage of these rolls are damaged during transportation due to mishandling. A principal cause of such damage is that the bag and corrugated box offer little impact resistance when the package is dropped or mishandled. When the package is dropped the inertial weight of the roll hitting a stationary object is enough to crush the center core of the roll. This center core is typically made from a rolled paper board and must remain circular so that the roll can be mounted to the mating spindle on a photo finisher's printing machine.

Crushed cores are the most common form of damage that occurs when the package impacts an obstruction along one of the four side flat faces of the box. Another form of damage includes denting of the outer laps of the paper roll. This is caused when the package hits an obstruction from an oblique angle or along one of the edges of the box. During this type of impact there is a very focused amount of energy imparted on the roll at its edges which causes denting and sometimes bruising of the roll of web.

Another failure mode of current packages of rolls of photosensitive web is roll telescoping. This is caused when the corrugated box distorts to a point where the end face of the roll is no longer fully supported. The roll responds by allowing the individual laps to move axially relative to one another forming what looks like a telescope.

Conventional end plates that support and locate paper rolls within a card board box are available from various manufacturers but have significant draw backs and can not be used to solve the above problems. First, they tend to be standardized to sizes which are significantly larger or smaller than photographic paper rolls. Second, they are typically non-continuous on the surface which supports the roll. Thus, during impact the end plate would leave impressions on the sensitive photographic paper. Third, conventional endplates are generally not designed for rolls as heavy as photographic paper. Consequently, to scale up one of these designs to handle the requirements of photographic paper the end plate wall thicknesses would be very thick, causing high production costs due to excess material usage and increased processing cycle time. Also, these thick sections at the central hub would tend to impart large reaction forces to the core of the roll such that ovalization of the core would occur. Yet another draw back to scaling up conventional end plate designs is that the large wall thicknesses would be prone to cracking from the excessive stresses built up during impact. The upscaled end plate would behave more like a ram than a bumper in that energy would be reflected instead of absorbed. Yet another disadvantage to conventional end plates is that the end plates are typically rectangular in shape. Tests have shown that a round roll only needs a round plate. Additional material only provides greater leverage of the destructive forces. Also, rectangular plates pose difficulties in automatic packaging.

One prior art attempt to solve these problems includes U.S. Pat. No. 5,232,092 which teaches a shock shield which permits rotation of tape reel within a shipping or storage case and which also absorbs shocks. The shock shield is formed by an annular body having a central axial hole which mounts within a case. Shock absorption is accomplished by compressible V-shaped annular bearing rings formed on the shield body. While the shock shield therein disclosed may have sufficed for its intended purpose, it does not fulfill the present need set forth hereinabove.

U.S. Pat. No. 3,260,362 discloses a roll suspension piece for shipping rolls of film. The suspension piece comprises a plastic molded flat backing with an integral hub, with the outer shape being octagonal in shape. Ribs below the flat backing are made integral with the central hub, forming a very rigid strong central support.

U.S. Pat. No. 4,570,794 discloses a bulk package of film rolls, each film roll physically separated from confronting surfaces of the package. This is accomplished with the use of separating plates and a removable mandrel supported by end caps.

U.S. Pat. No. 4,826,008 discloses a package for light sensitive materials consisting of a tubular section and mating removable end closures. The removable end closures have light tight channels which can be made with a bayonet or screwable feature for joining to the tube section.

U.S. Pat. No. 5,167,322 discloses a wrapped package of wound material. The wrapping is affixed to the wound web by means of an end header and support disk. The support disk traps the wrapping on the end and provides support to the roll edges when placed on its side such that roll telescoping does not occur.

Accordingly, there persists a need for an economical, light weight, easy to manufacture and use, support plate that can attenuate and thus absorb impact energy before it reaches and damages the product supported thereon, such as a roll of photosensitive web.

SUMMARY OF THE INVENTION

To solve one or more of the problems of the prior art, there is provided, in one aspect of the invention, a support plate for protecting an object from shock, the object having a core, the plate comprising:

a first side and a second side opposite the first side, the first side comprising a first substantially smooth surface and a hub member projecting essentially normally from the first substantially smooth surface for engageably supporting the core thereon, the hub member and the first substantially smooth surface being adjoined by a grooved portion, and wherein the hub member includes a cavity portion projecting outwardly of the second side;

the second side having a first energy attenuation region surrounding the cavity portion, the first attenuation region being provided with means to flex in response to shock, the flex means comprising the grooved portion, a second substantially smooth surface adjoining the grooved portion, and a first annular rib surrounding the second substantially smooth surface;

the second side further comprising a second energy attenuation region surrounding the first energy attenuation region, and a third energy attenuation region surrounding the second energy attenuation region;

whereby the first, second and third energy attenuation regions are successively arranged generally concentric to the hub member so that substantially all shock incurred initially by the third energy attenuation region is virtually absorbed by the second and first attenuation regions thereby protecting the object supported on the hub from shock.

In another aspect of the invention, an article of manufacture comprises a container having an closable end portion. A roll of photosensitive web has a core which is supported on support plates, as described previously, and the combination is positionable snugly inside the container and then closed for shipping.

In yet another aspect of the invention, an article of manufacture comprises a container having an interior compartment and first and second opposite sidewalls surrounding said interior compartment, each the sidewalls having a first side facing outwardly of the interior compartment and a second side facing inwardly of the interior compartment opposite the first side. The first side is provided with a hub member projecting normally therefrom for supporting the core thereon. The hub member has a cavity portion projecting outwardly of the second side, and wherein at least one of the sidewalls is further characterized by the features described above.

BRIEF DESCRIPTION OF THE DRAWINGS

The foregoing as well as other objects, features and advantages of this invention will become more apparent from the appended Figures, wherein like reference numerals denote like elements, and wherein.

DETAILED DESCRIPTION OF THE INVENTION

Turning now to the drawings, and more particularly to FIGS. 1-5, the energy attenuating support plate 10 for an object (R), such as a roll of photosensitive web mounted on a core (C), is illustrated. Broadly described, the energy attenuating support plate 10 includes a first side 12 and a second side 14 opposite the first side 12. The first side 12 comprises a first substantially smooth surface 16 and a hub member 18 projecting normally from the first substantially smooth surface 16 for engageably supporting the core thereon. In the preferred embodiment, the hub member 18 and the first substantially smooth surface 16 are adjoined preferably by a molded grooved portion 20. There are no other connections between hub member 18 and first substantially smooth surface 16 to ensure sufficient de-coupling which keeps impact stresses to a minimum at the joint. If the hub member 18 was rigidly connected to the first substantially smooth surface 16 then the hub member 18 would be prevented from flexing during impact and deformation of the core (C) could occur. Moreover, hub member 18 (described more fully below) includes a cavity portion 22 projecting outwardly of the second side 14.

Figures 1, 4:
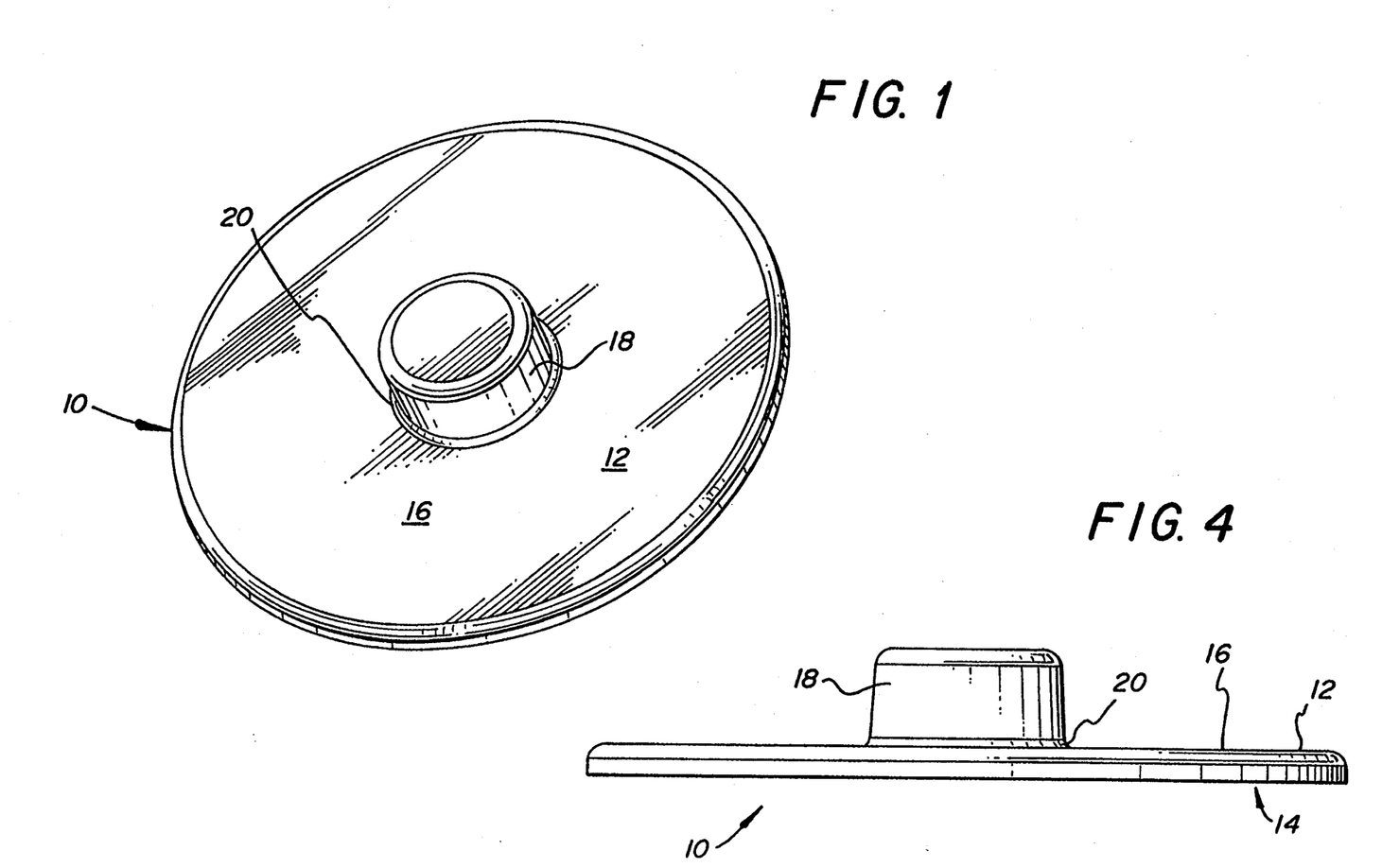
FIG. 1 is a top perspective view of one side of the energy attenuating support plate in its preferred embodiment.
FIG. 4 is a side view of the energy attenuating support plate.
Figure 2:
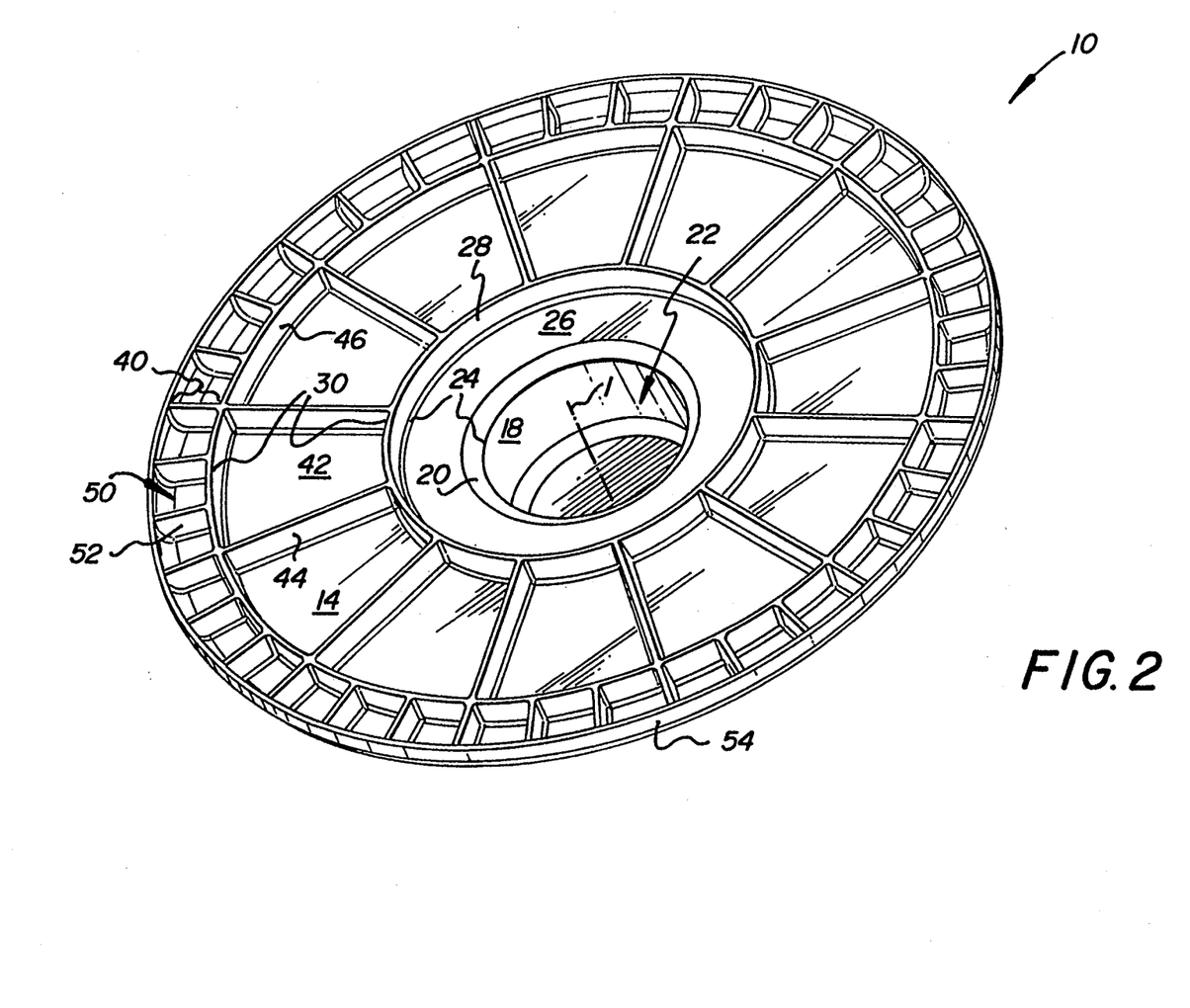
FIG. 2 is a bottom perspective view of the opposite side of the energy attenuating support plate in its preferred embodiment.

With reference to FIGS. 1 and 2, a preferred embodiment of the energy absorbent end plate comprises an axial hub member 18 which locates the roll of photosensitive web, and first substantially smooth surface 16 which protects and supports the edge surfaces of the roll (R). The hub member 18 is thin enough to flex during impact yet thick enough not to yield permanently or buckle, thus rebounding to its original shape after the impact. This ensures that it is the hub member 18 that deforms and absorbs energy rather than the core (C) of the roll (R). The core (C) of the roll (R) is generally highly sensitive to large localized impact loads. Therefore, when the hub member 18 flexes, it absorbs energy thereby reducing the magnitude of the impact load transferred to the roll (R). Furthermore, the flexing of the hub member 18, ensures that the impact loads are distributed over a broad surface area of the core (C).

In the preferred embodiment, the second side 14 includes a first energy attenuation region 24 surrounding the cavity portion 22. Preferably, first attenuation region 24 is provided with means to flex in response to shock. The preferred flex means include the grooved portion 20 having a radius in the range of 0.090 inches (0.229 cm) to about 0.150 inches (0.381 cm)., a second substantially smooth surface 26 adjoining the grooved portion 20, and a first annular rib 28 surrounding the second substantially smooth surface 26. First energy attenuation region 24 controls the foundation flexibility of the hub member 18. The size of region 24, as controlled by the placement of first annular rib 28, determines its flexibility. If the first annular rib 28 is placed too close to the grooved portion 20, then the flexibility of the first energy attenuation region 24 is too high and the grooved portion 20 and hub member 18 are over constrained and cracking will occur in the grooved portion 20 and first substantially smooth surface 16. If, however, the first annular rib 28 is too large in diameter, then the first energy attenuation region 24 becomes too large and too flexible allowing the hub member 18 to bend too far under loading such that the roll (R) is allowed to impact the side walls of the shipping box during a side or lower edge impact. This is important because when the roll (R) touches the side of the shipping box during impact it may also touch the obstruction which instantly produces a reaction shock force through the roll (R) which results in core (C) permanent deformation. Other factors which may influence the flexibility of the plate 10 of the invention are the plate 10 sectional thickness and the dynamic elastic modules of the plate 10 material.

Turning again to FIGS. 2 and 3, second side 14 further comprises a second energy attenuation region 30 surrounding the first energy attenuation region 24, and a third energy attenuation region 40 surrounding the second energy attenuation region 30.

Figures 3, 5:
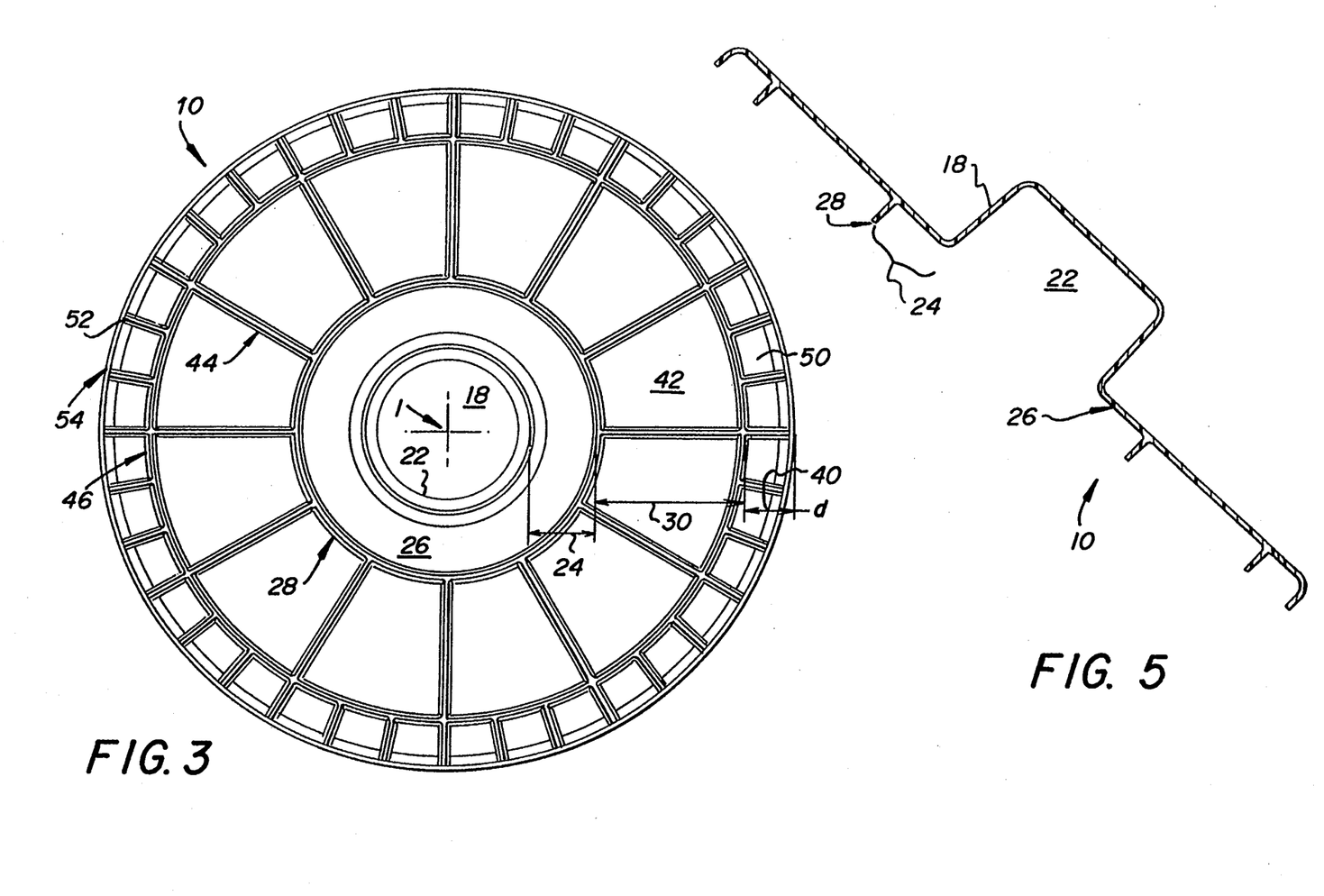
FIG. 3 is a bottom view of the energy attenuating support plate.
FIG. 5 is a cross sectional view along the line 5—5 of FIG. 4.

Second energy attenuation region 30 comprises a third substantially smooth surface 42 coplanar with the second substantially smooth surface 26, a plurality of spaced first ribs 44 extending generally radially from a central axis 1 through the cavity portion 22 of the hub member 18 and along the third substantially smooth surface 42, and a second annular rib 46 surrounding the spaced first ribs 44. Alternatively, the first substantially smooth surface 24 may comprise at least one contoured opening 48, preferably a plurality, for absorbing increased energy.

Moreover, in the preferred embodiment of the invention, the third energy attenuation region 40 comprises a fourth substantially smooth surface 50 coplanar with the third substantially smooth surface 42. Also, a plurality of spaced second ribs 52 extends generally radially from the central axis 1 of the cavity portion 22 of the hub member 18 and along the fourth substantially smooth surface 50. A third annular rib 54 surrounds the spaced second ribs 52. In the preferred embodiment, the spaced second ribs 52 are supported between the second and third annular ribs 46,54.

In a preferred embodiment, the number of spaced second ribs 52 in the third energy attenuation region 40 equals or exceeds the number of first spaced ribs 44 in the second energy attenuation region 30. In a most preferred embodiment, the number of spaced second ribs 52 in the third energy attenuation region 40 is at least twice the number of spaced first ribs 44 in the second energy attenuation region 30.

The spaced first ribs 44 in the second energy attenuation region 30 are defined relative to a respective plane (p) passing through the central axis 1 of the hub member 18. Similarly, the spaced second ribs 52 in the third attenuation region 40 are defined relative to a respective plane (p) passing through the central axis 1 of the hub member 18.

In a preferred embodiment, at least one spaced first rib 44 in the second energy attenuation region 30 is coplanar with one spaced second rib 52 in the third energy attenuation region 42.

The coplanar ribs 44,52 are moldably joined at the second annular rib 46. Second annular rib 46 is preferably just somewhat larger in diameter than the largest diameter on the roll (R). Moreover, second annular rib 46 serves to separate the distortion generally in the third energy attenuation region 40 of the plate 10 from the second energy attenuation region 30 which supports the roll (R).

Further, in the third energy attenuation region 40, third annular rib 54 defines the outer edge of the plate 10 which takes the initial impact and locates the plate 10 within the box (B). The third annular rib 54 is preferably larger than the roll (R) maximum diameter by approximately the width (d) of the third energy attenuation region 40 (FIG. 3). During approximately 2 millisecond duration of the impact, the roll (R) is allowed to slide into region 40 of the plate 10 due to the flexibility of the hub member 18. If the width of region 40 is too small, then there is not enough de-coupling between the distortions of regions 30,40 of the plate 10 and the hub member 18 of the first substantially smooth surface 16 which directly support the roll (R). If the third annular rib 54 is too large then much material is wasted during the manufacture of the plate 10 which then raises production cost. Also, a third annular rib 54 which is larger than necessary requires a larger than necessary corrugated box (B) (see FIGS. 6 and 8) which translates into lower palletized shipping densities which adds significantly to the package shipping costs.

The third and second annular ribs 54,46 are joined by a plurality of spaced second ribs 52, as described above. Spaced second ribs 52 serve to absorb energy from the third annular rib 54. The spaced second ribs 52 are designed to dissipate energy by buckling during excessive impact conditions. If the spaced second ribs 52 are too stiff then all of the distortion energy from the corrugated box (B) would be transferred to the second annular rib 46. If the spaced second ribs 52 are too soft, then they buckle, severely under light impact loading conditions in such a manner as to draw inward the third annular rib 54. Also, folding downward of the first substantially smooth surface 16 can occur. Any distortion energy which can not be absorbed and dissipated by the spaced second ribs 52 is transferred into the second annular rib 46. Because second annular rib 46 preferably has a larger diameter than the roll (R), it can absorb and redistribute the impact energy prior to that energy reaching the hub member 18 of the first substantially smooth surface 16 which directly supports the roll (R). The large spaced first ribs 44 serve to prevent the first substantially smooth surface 16 from distorting under the roll (R) dynamic weight of impact, also to provide radial support to the second annular rib 46.

The first, second and third energy attenuation regions 24,30,40 are successively arranged generally concentric to the cavity portion 22 of the hub member 18 so that substantially all shock incurred initially by the third energy attenuation region 40 is virtually absorbed by the second and first attenuation regions 30,24 thereby protecting the roll (R) from shock.

Figure 6:
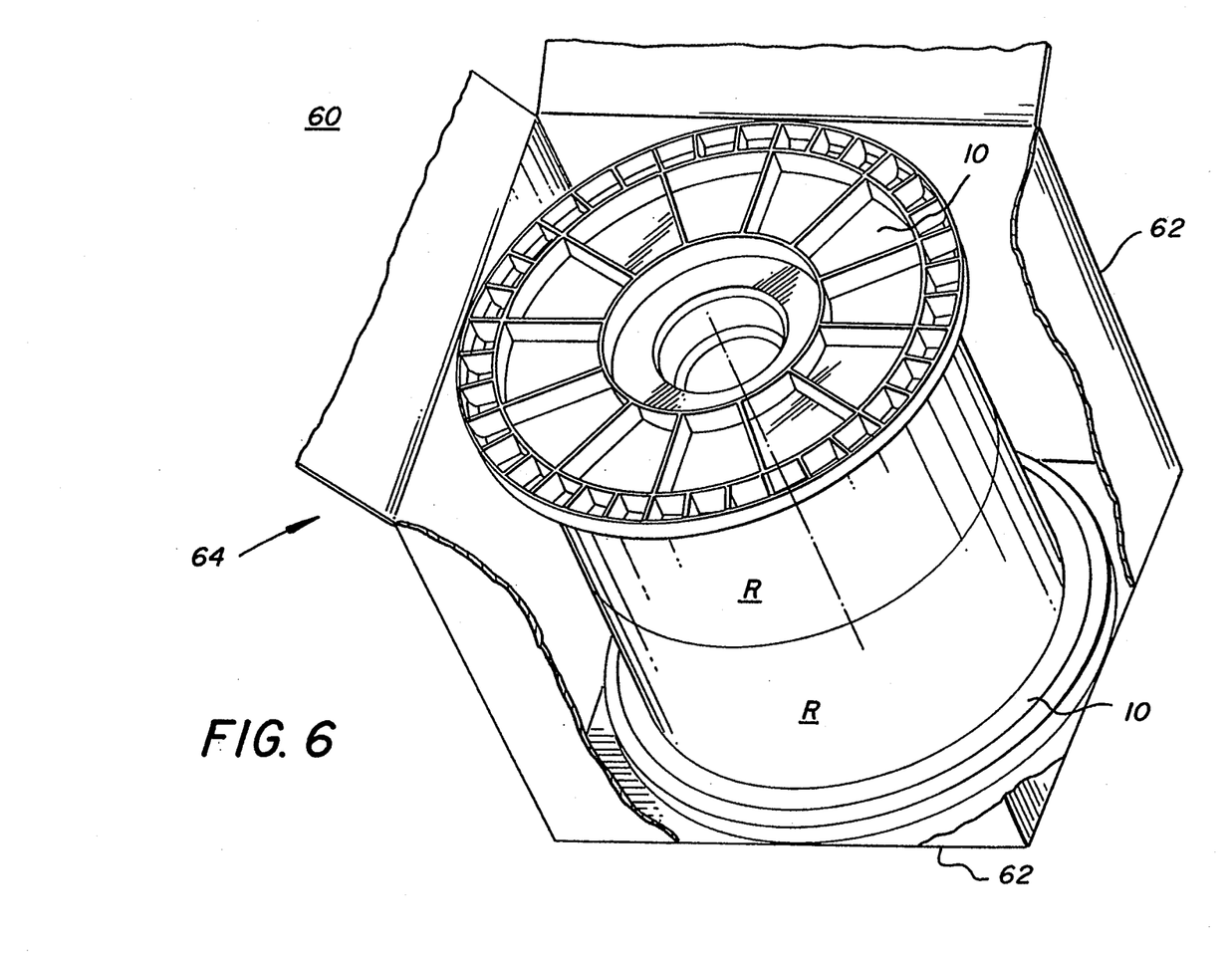
FIG. 6 is a perspective view of an article of manufacture, partially torn away, to expose the end plates supporting a roll and a shipping box.
Figure 7:
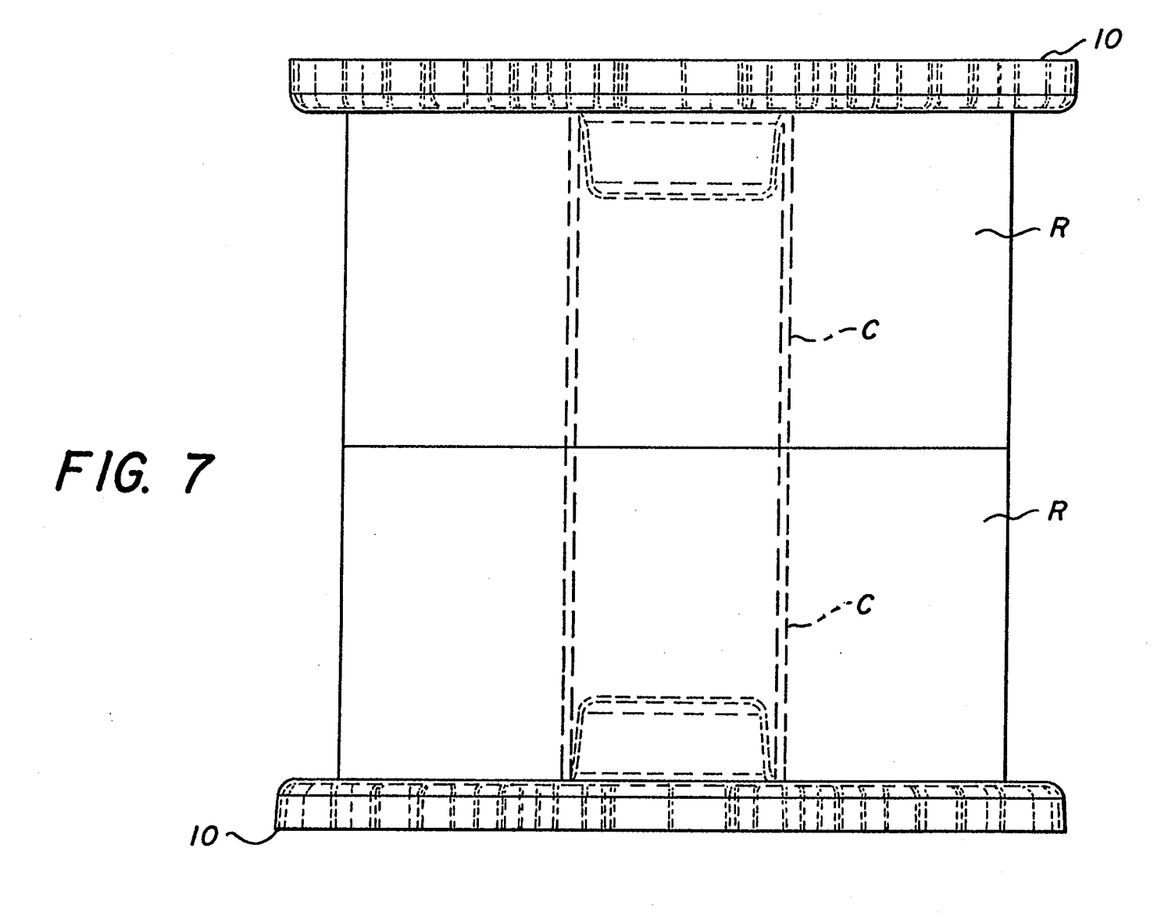
FIG. 7 is a side view of the article of manufacture showing, in phantom, the hub members engageably supporting the core; and, FIG. 8 is a side view of the article of manufacture (in a side drop test) including a box-type container and showing, in phantom, the core engaging and supporting the core of the object.
Figure 8:
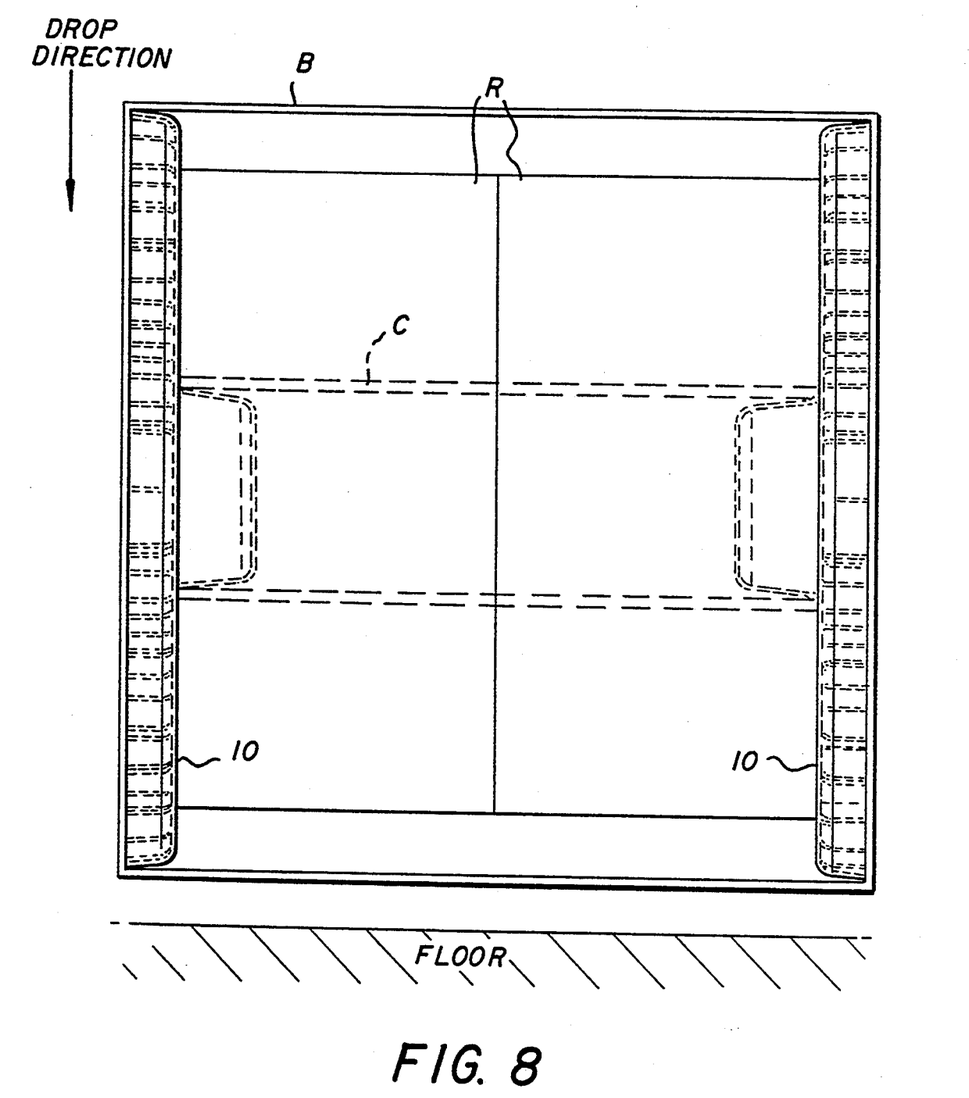

In FIGS. 6-8, another embodiment of the invention includes an article of manufacture 60 as illustrated. According to FIGS. 6 and 8, an article of manufacture 60 includes a container, such as a corrugated box (B), having a closed end portion 62 and openable end portion 64 for enclosing an object, such as a roll of photosensitive web having a core. In this aspect of the invention, the roll (R) is supported on an energy attenuating support plate 10 (previously described) positionable snugly inside the container 62. The article of manufacture 60 protects the enclosed object from damage due to shock of transportation and handling. While it is preferred that the support plates 10 are mounted either end of the core (C), and then the assembly inserted into the container for final packaging, one skilled in the art will appreciate that a side wall of the box (B) can comprise at least one support plate 10 for receiving and supporting the object thereon from shock.

The energy attenuating support plate 10 of the invention is made from a high density polyethylene (HDPE) material, preferably Fortiflex T50-4400, made by Solvay Polymers, Inc. of Houston, Tex. HDPE is preferred because of its recyclability, inexpensive cost and relatively short molding cycle time. Moreover, HDPE has a high elongation when it yields or fractures. This property allows for large amounts of impact energy to be absorbed. Obviously, plate 10 may alternatively be made of any material which has a high elongation at fracture, such as low density polyethylene, polypropylene, polycarbonate or a mixture thereof.

The invention has therefore been described with reference to certain embodiments thereof, but it will be understood that variations and modifications can be effected within the scope of the invention.

| PARTS LIST | |
| --- | --- |
| Roll | R |
| Respective Plane | p |
| Width | d |
| Box | B |
| Core | C |
| Central Axis | 1 |
| Support Plate | 10 |
| First Side | 12 |
| Second Side | 14 |
| First Substantially Smooth Surface | 16 |
| Hub Member | 18 |
| Molded Groove Portion | 20 |
| Cavity Portion | 22 |
| First Energy Attenuation Region | 24 |
| Second Substantially Smooth Surface | 26 |
| First Annular Rib | 28 |
| Second Energy Attenuation Region | 30 |
| Third Energy Attenuation Region | 40 |
| Third Substantially Smooth Surface | 42 |
| Spaced First Ribs | 44 |
| Second Annular Rib | 46 |
| Contoured Opening | 48 |
| Fourth Substantially Smooth Surface | 50 |
| Spaced Second Ribs | 52 |
| Third Annular Rib | 54 |
| Article of Manufacture | 60 |
| Closed end | 62 |
| Openable end | 64 |

I claim:

1. Energy attenuating support plate for protecting an object having a core from shock, said plate comprising:

a first side and a second side opposite said first side, said first side comprising a first substantially smooth surface and a hub member projecting essentially normally from said first substantially smooth surface for engageably supporting said core thereon, said hub member and said first substantially smooth surface being adjoined by a grooved portion, and wherein said hub member includes a cavity portion projecting outwardly of said second side;

said second side having a first energy attenuation region surrounding said cavity portion, said first attenuation region being provided with means to flex in response to shock, said flex means comprising said grooved portion, a second substantially smooth surface adjoining said grooved portion, and a first annular rib surrounding said second substantially smooth surface;

said second side further comprising a second energy attenuation region surrounding said first energy attenuation region, and a third energy attenuation region surrounding said second energy attenuation region;

whereby said first, second and third energy attenuation regions are successively arranged generally concentric to the hub member so that substantially all shock incurred initially by the third energy attenuation region is virtually absorbed by said second and first attenuation regions thereby protecting said object supported on the hub from shock.

2. The plate recited in claim 1 wherein said second energy attenuation region comprises a third substantially smooth surface coplanar with said second substantially smooth surface, a plurality of spaced first ribs extending generally radially from a central axis in said cavity portion of said hub and along said third substantially smooth surface, and a second annular rib surrounding said spaced first ribs.

3. The plate recited in claim 1 wherein said third attenuation region comprises a fourth substantially smooth surface coplanar with said third substantially smooth surface, a plurality of spaced second ribs extending generally radially from said central axis of said cavity portion of said hub and along said fourth substantially smooth surface, and a third annular rib surrounding said spaced second ribs, said spaced second ribs being supported between said second and third annular ribs.

4. The plate recited in claim 2 wherein said second substantially smooth surface comprises at least one contoured opening.

5. The plate recited in claim 3 wherein the number of spaced second ribs in the third energy attenuation region equals or exceeds the number of first spaced ribs in the second energy attenuation region.

6. The plate in claim 5 wherein the number of spaced second ribs in the third energy attenuation region is at least twice the number of spaced first ribs in the second energy attenuation region.

7. The plate recited in claim 2 wherein said spaced first ribs in the second energy attenuation region are defined relative to a respective plane passing through a central axis of the hub.

8. The plate recited in claim 3 wherein said spaced second ribs in the third attenuation region are defined relative to a respective plane passing through the central axis of the hub.

9. The plate recited in claim 6 wherein at least one spaced first rib in said second energy attenuation region is coplanar with one spaced second rib in said third attenuation region.

10. The plate recited in claim 9 wherein the coplanar ribs are joined at said second annular rib.

11. The plate recited in claim 1 wherein said first and second sides are made from a molded plastic resin material.

12. The plate recited in claim 1 wherein said grooved portion has a radius in the range of about 0.090 inches to about 0.150 inches.

13. An article of manufacture comprising:

a container having a closed end portion and openable end portion;

a roll of photosensitive web having a core, said roll being supported on an energy attenuating support plate positionable inside said container, said support plate comprising:

a first side and a second side opposite said first side, said first side comprising a first substantially smooth surface and a hub member projecting essentially normally from said first substantially smooth surface for engageably supporting said core thereon, said hub member and said first substantially smooth surface being adjoined by a grooved portion, and wherein said hub member includes a cavity portion projecting outwardly of said second side;

said second side having a first energy attenuation region surrounding said cavity portion, said first attenuation region being provided with means to flex in response to shock, said flex means comprising said grooved portion, a second substantially smooth surface adjoining said grooved portion, and a first annular rib surrounding said second substantially smooth surface;

said second side further comprising a second energy attenuation region surrounding said first energy attenuation region, and a third energy attenuation region surrounding said second energy attenuation region;

whereby said first, second and third energy attenuation regions are successively arranged generally concentric to the hub member so that substantially all shock incurred initially by the third energy attenuation region is virtually absorbed by said second and first attenuation regions thereby protecting said object supported on the hub from shock.

14. An article of manufacture comprising a container having an interior compartment, and first and second opposite sidewalls, each said sidewalls having a first side facing inwardly of said interior compartment and a second side opposite said first side facing outwardly of said interior compartment, said first side being provided with a hub member projecting essentially normally therefrom for supporting said core thereon, said hub member having a cavity portion projecting outwardly of said second side, and wherein at least one of said sidewalls is further characterized by:

said second side having a first energy attenuation region surrounding said cavity portion, said first attenuation region being provided with means to flex in response to shock, said flex means comprising said grooved portion, a second substantially smooth surface adjoining said grooved portion, and a first annular rib surrounding said second substantially smooth surface;

said second side further comprising a second energy attenuation region surrounding said first energy attenuation region, and a third energy attenuation region surrounding said second energy attenuation region;

whereby said first, second and third energy attenuation regions are successively arranged generally concentric to the hub member so that substantially all shock incurred initially by the third energy attenuation region is virtually absorbed by said second and first attenuation regions thereby protecting said object supported on the hub from shock.

* * * * *